April 12, 1938.                C. H. REYNOLDS                2,113,746
                                OIL FILLED CABLE
                              Filed Dec. 5, 1936
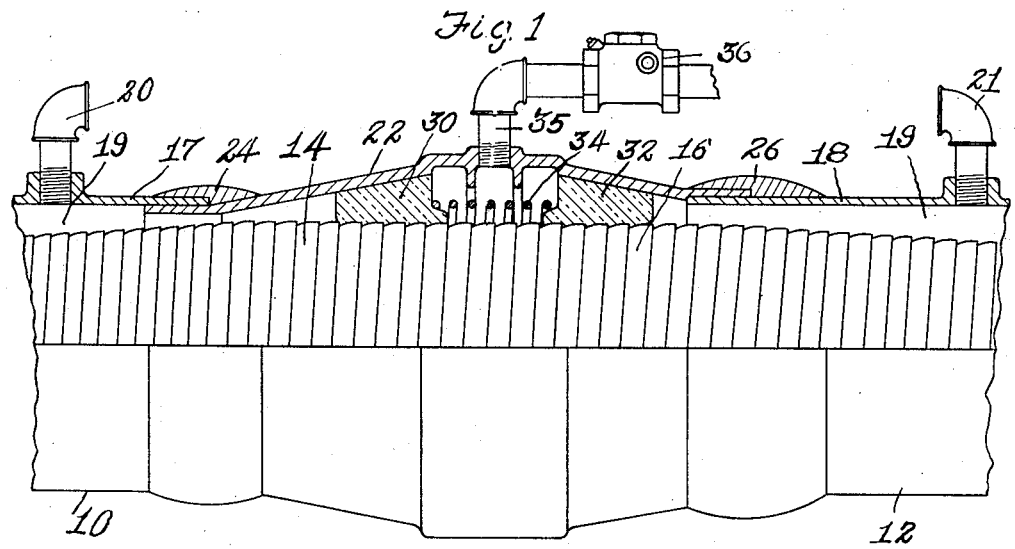
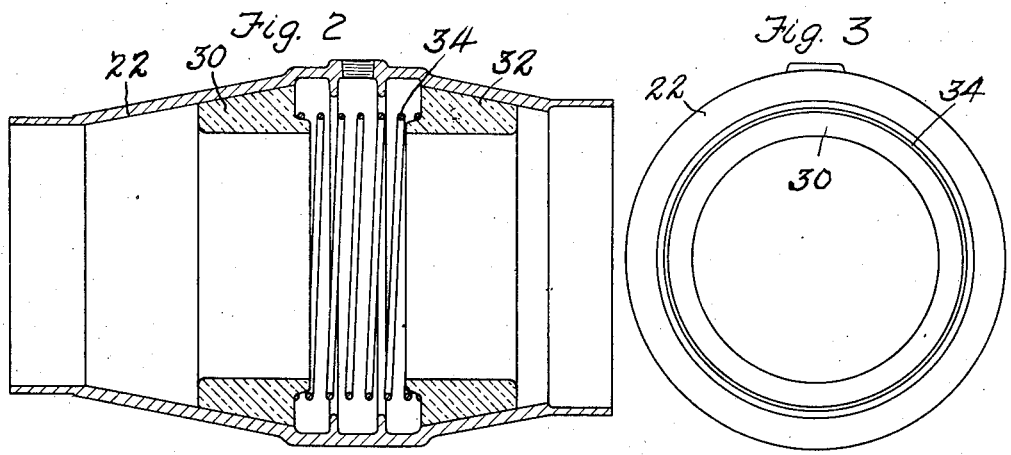
INVENTOR.
Charles H. Reynolds
BY
J. Stanley Churchill.
ATTORNEY.

Patented Apr. 12, 1938

2,113,746

UNITED STATES PATENT OFFICE 2,113,746

OIL FILLED CABLE

Charles H. Reynolds, Malden, Mass., assignor to Albert & J. M. Anderson Manufacturing Company, South Boston, Mass., a corporation of Massachusetts Application December 5, 1936, Serial No. 114,429

8 Claims. (Cl. 247—27)

This invention relates to an oil filled cable.

The object of the invention is to provide a novel and improved oil tight stop-joint for an oil filled cable with which oil leakage may be reduced to a minimum and whose construction is such as to lend itself to ease of tightening up any joints which should leak after extended service, in a simple, economical and practical manner.

A further object of the invention is to provide a novel and improved oil tight stop-joint for an oil filled cable, in which insulating packing members are forced by insulating liquid pressure into oil tight relationship with a housing and with the cable ends.

With these general objects in view and such others as may hereinafter appear, the invention consists in the oil tight stop-joint for oil filled cables and in the various structures, arrangements, and combinations of parts hereinafter described and particularly defined in the claims at the end of this specification.

In the drawing illustrating the preferred embodiment of the invention, Fig. 1 is a view partly in section and partly in elevation illustrating an oil tight stop-joint embodying the present invention; Fig. 2 is a longitudinal section of the stop-joint housing and associated parts; and Fig. 3 is an end elevation of the parts shown in Fig. 2.

It has heretofore been proposed to construct stop-joints for oil filled cables utilizing packing members within a stuffing box which were arranged to be placed under pressure by a series of screws located at spaced intervals around the cable. Experience has shown, however, that this construction of stop-joint oftentimes develops leaks, particularly after the cable has been in service for any substantial period of time. The development of a leak has necessitated the removal and repacking of the entire stuffing box involving unnecessary expense and consuming a substantial amount of time, and as a result these prior stop-joints have not been entirely satisfactory.

In accordance with the present invention, an improved stop-joint for oil filled cables is provided in which the joint is formed by annular packing members, preferably of oil resisting insulating material, which are movably arranged within a metallic or other housing and adapted to be forced into oil tight relation with respect to the cable upon which they are mounted and also with respect to the joint housing or casing. It is preferred to apply pressure to the adjacent faces of the two packing members to force them longitudinally of the cable and in a direction away from one another and this pressure is preferably produced by fluid, preferably an insulating liquid such as oil, pumped under pressure into the space within the housing between the packing members and provision is preferably made for maintaining such fluid pressure within such space by a closure valve, plug or other suitable device as will be described.

Referring now to the drawing, 10, 12 represent the opposite end portions of any usual or preferred structure of oil filled cable, and which essentially comprises cable members 14, 16 disposed within usual metallic sheathings, 17, 18, preferably of lead, and the space 19 between the cable and its protective sheathing is, in accordance with the usual practice, filled with oil through the usual inlet members 20, 21.

In order to provide an oil tight stop-joint, a metallic or other housing 22, preferably of bronze, is arranged to be secured to the metallic sheathings 17, 18, of the cable sections by wiped joints 24, 26 or otherwise. The metallic housing 22 has disposed within it two packing members 30, 32 of any usual or preferred oil resisting material, preferably of a resilient nature and which may be purchased in the open market, and these packing members preferably take the form of annular rings. The packing members are mounted free to move longitudinally of the housing and are preferably maintained in spaced relation by a coil spring 34 as illustrated. The metallic housing with the packing members disposed therein is positioned so that the packing members are mounted on the cable ends and provision is made for forcing the packing members away from one another and in a direction to fill the space between the cable and the metallic housing by pressure exerted upon the adjacent inner faces of the packing members. As herein shown, the metallic housing is provided with an inlet pipe 35 having any usual or preferred form of valve 36. The metallic housing is preferably shaped to taper toward the cable in a direction toward the ends of the housing so that as pressure, preferably oil pressure, is introduced into the annular space between the packing members and within the housing, the packing members are forced longitudinally of the cable and housing and toward the ends of the housing and into a position to form an oil tight joint both with the cable and with the housing. By closing the valve 36 this oil pressure may be maintained.

One of the important advantages resulting from the present structure of oil filled cable resides in the uniformity of pressure exerted upon the packing members around the entire face thereof resulting in the maintenance of a uniform pressure between the packing members and both the housing and the cable sections, thus reducing to a minimum the liability of leakage of oil past the packing members.

At any time in service, the joint can be tested for tightness by a standard testing pump and a standard pressure gauge while the joint remains in service. Also if a leak should develop, the same pump can be used to build up oil pressure to force the packing members apart and restore the tight joint between the packing members and the cable ends and housing.

While the preferred embodiment has been herein illustrated and described, it will be understood that the invention may be embodied in other forms within the scope of the following claims.

Having thus described the invention, what is claimed is:

1. The combination with two ends of an oil filled cable of the type having cable members within metallic sheathings, of a housing secured to the metallic sheathings in fluid type relation and packing members within the housing capable of being moved toward the ends thereof by pressure exerted upon the adjacent faces, and means for introducing fluid under pressure into the housing and between the packing members.

2. The combination with two ends of an oil filled cable of the type having cable members within metallic sheathings, of a housing secured to the metallic sheathings in fluid type relation and packing members within the housing capable of being moved toward the ends thereof by pressure exerted upon the adjacent faces thereof, and means for introducing fluid under pressure into the housing and between the packing members.

3. The combination with two ends of an oil filled cable of the type having cable members within metallic sheathings, of a housing secured to the metallic sheathings in fluid type relation and packing members within the housing capable of being moved toward the ends thereof by pressure exerted upon the adjacent faces, said metallic housing being shaped to taper toward the opposite ends thereof, packing rings disposed within the housing and mounted upon the cable ends and means for introducing fluid under pressure into the housing and between said packing rings whereby to force the packing rings into fluid type relationship with the cable sections and the tapered portions of the housing.

4. The combination with two ends of an oil filled cable of the type having cable members within metallic sheathings, of a housing secured to the metallic sheathings in fluid type relation and packing members within the housing capable of being moved toward the ends thereof by pressure exerted upon the adjacent faces, said housing being tapered toward the ends thereof, and means for introducing fluid under pressure into the housing and between said packing rings whereby the packing rings are forced by said fluid pressure into oil tight relationship with the tapered portions of the housing and said cable sections.

5. The combination with two ends of an oil filled cable of the type having cable members within metallic sheathings, of a housing secured to the metallic sheathings in fluid type relation and packing members within the housing capable of being moved toward the ends thereof by pressure exerted upon the adjacent faces, and means for exerting fluid pressure upon the packing members to force them toward the ends of the housing and into tight fitting engagement with said cable members.

6. The combination with two ends of an oil filled cable of the type having cable members within metallic sheathings, of a housing secured to the metallic sheathings in fluid type relation and packing members within the housing capable of being moved toward the ends thereof by pressure exerted upon the adjacent faces, and means for exerting fluid pressure on the inner face of a packing member to force it toward one end of the housing.

7. The combination with two ends of an oil filled cable of the type having cable members within metallic sheathings, of a housing secured to the metallic sheathings in fluid type relation, two spaced resilient oil resisting packing members within the housing and means for introducing and maintaining oil under pressure within said housing and between said packing members, said housing being shaped to force said packing members into contact with the cable when subjected to said oil pressure.

8. The combination with two ends of an oil filled cable of the type having cable members within metallic sheathings, of a housing secured to the metallic sheathings in fluid type relation, two spaced resilient oil resisting packing members within the housing and means for introducing and maintaining oil under pressure within said housing and between said packing members including an oil inlet into the housing and a closure member for said inlet, said housing being shaped to force said packing members into contact with the cable when subjected to said oil pressure.

CHARLES H. REYNOLDS.